Mar. 5, 1929.  G. GODDU ET AL  1,703,929
FASTENING INSERTING MACHINE
Filed Oct. 2, 1922  4 Sheets-Sheet 2
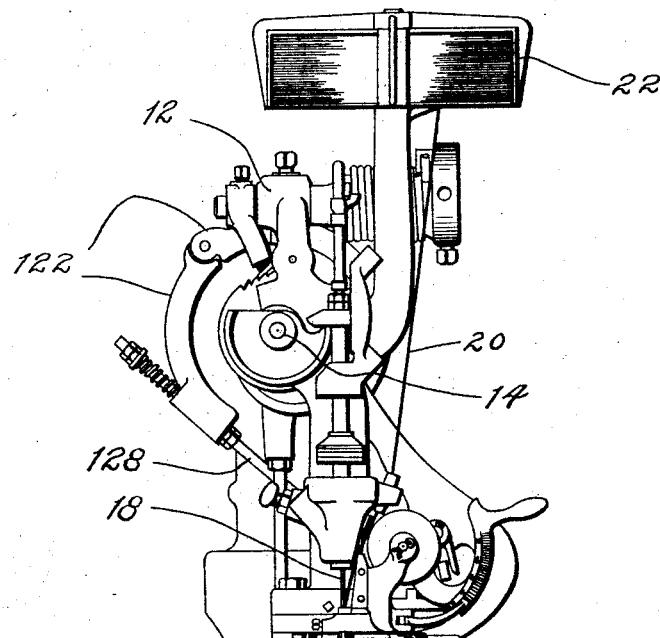
Fig. 2.  Fig. 3.
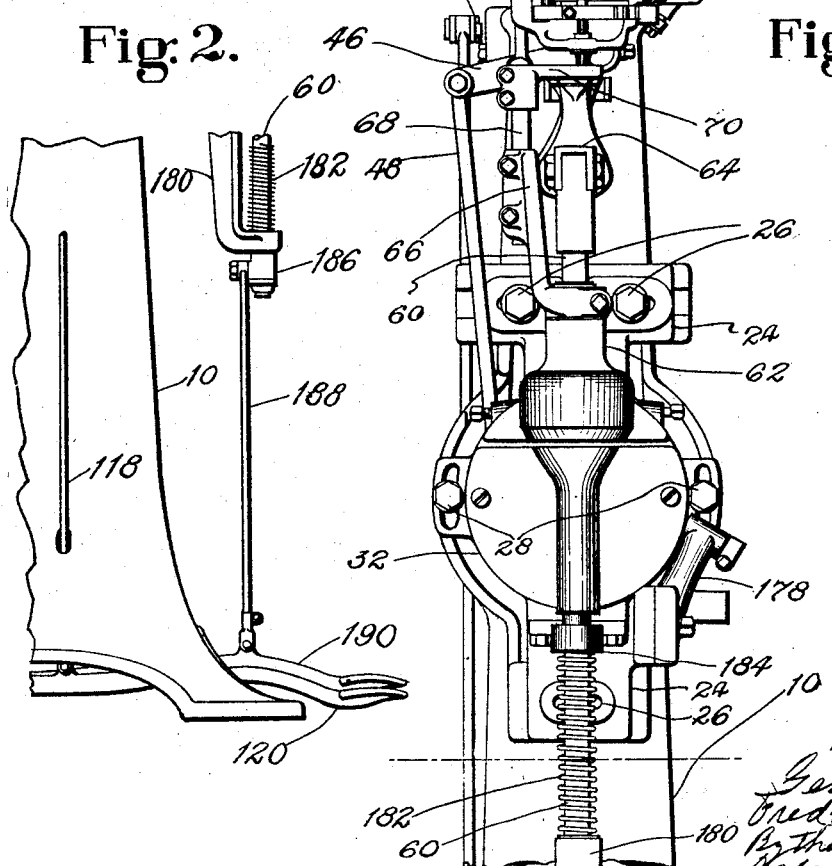
INVENTORS
George Goddu
Fred L. Mackenzie
By their Attorney
Nelson H. Howard

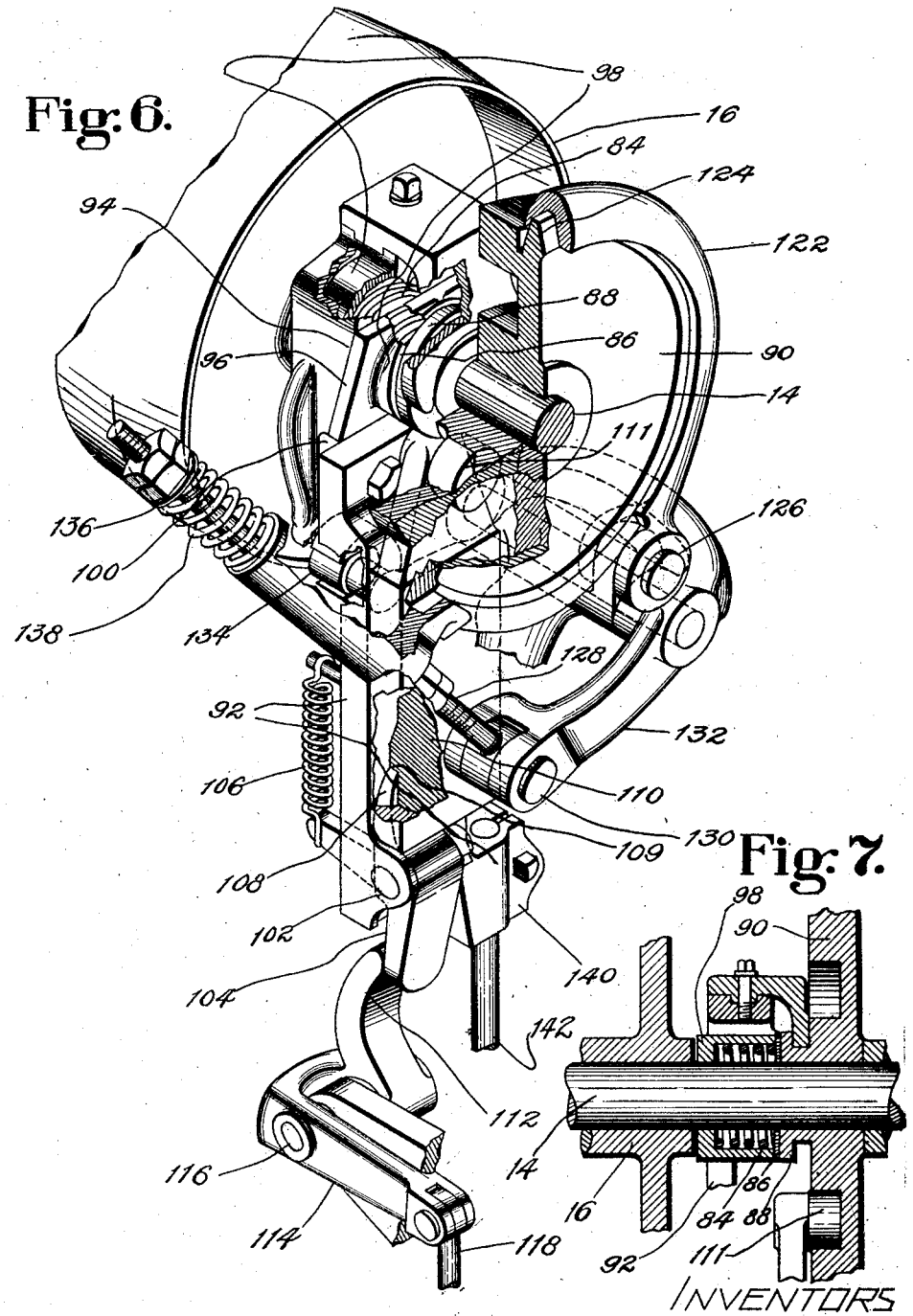

Patented Mar. 5, 1929.

1,703,929

UNITED STATES PATENT OFFICE.

GEORGE GODDU, OF WINCHESTER, AND FRED L. MACKENZIE, OF BEVERLY, MASSACHUSETTS, ASSIGNORS TO UNITED SHOE MACHINERY CORPORATION, OF PATERSON, NEW JERSEY, A CORPORATION OF NEW JERSEY.

FASTENING-INSERTING MACHINE.

Application filed October 2, 1922. Serial No. 591,922.

This invention relates to fastening inserting machines and work supports therefor.

In the manufacture of wood heels it is usual, after the heels have been covered, to secure leather toplifts to the tread surfaces thereof. Slugs or headless tacks are frequently used to hold or to assist in holding the toplifts in place. Heretofore these tacks have usually been inserted by hand or by fastening inserting machines designed either for general purposes or at least without this particular operation in view, and sometimes having work supports arranged to be depressed periodically to permit movement of the work manually by the operative or by the awl of the machine on the work support between the insertion of successive fastenings. While toplifts can be and are attached to wood heels under these circumstances in a fairly satisfactory manner they can not be attached as well or as cheaply as they could be by a machine especially adapted for this particular operation.

It is accordingly an object of the present invention to provide a fastening inserting machine particularly adapted to the attaching of toplifts to wood heels.

Many wood heels, particularly those of the Louis type, have their contour surfaces concave immediately adjacent to the tread surface. To facilitate the insertion of fastenings in the tread surfaces of such heels, the invention contemplates an arrangement of the machine permitting the insertion of fastenings at an inclination to the tread surfaces of the heels so as to cause the fastenings to toe in towards the axes of the heels in which they are inserted. With this in view a feature of the invention comprises the combination of fastening inserting means and a work support arranged to present the work thereto and rotatable about an axis out of alinement with and at an inclination to the line of drive of the fastenings. In the illustrative machine the angular relation of the axis of rotation of the work support and the line of drive may be varied to conform to the shape of the different heels operated upon. In accordance with another feature of the invention the illustrated machine is provided with novel mechanism by which the work support is moved forward a step after the insertion of each fastening and when the machine is stopped is moved in the reverse direction and returned to its initial position.

With the above and other features and objects in view the invention will now be described in connection with the accompanying drawings, which illustrate a preferred exemplification of the invention, and pointed out in the subjoined claims.

Fig. 2 is a side elevation on a smaller scale of a portion of the base and treadle mechanism of the machine of Fig. 1, and serves substantially to complete that figure;

Fig. 3 is a front elevation of the structure of Fig. 1;

Fig. 6 is a perspective view, partly broken away, of the clutch and brake mechanism of the machine; and Fig. 7 is a longitudinal section of a portion of the clutch mechanism.

Figure 1:
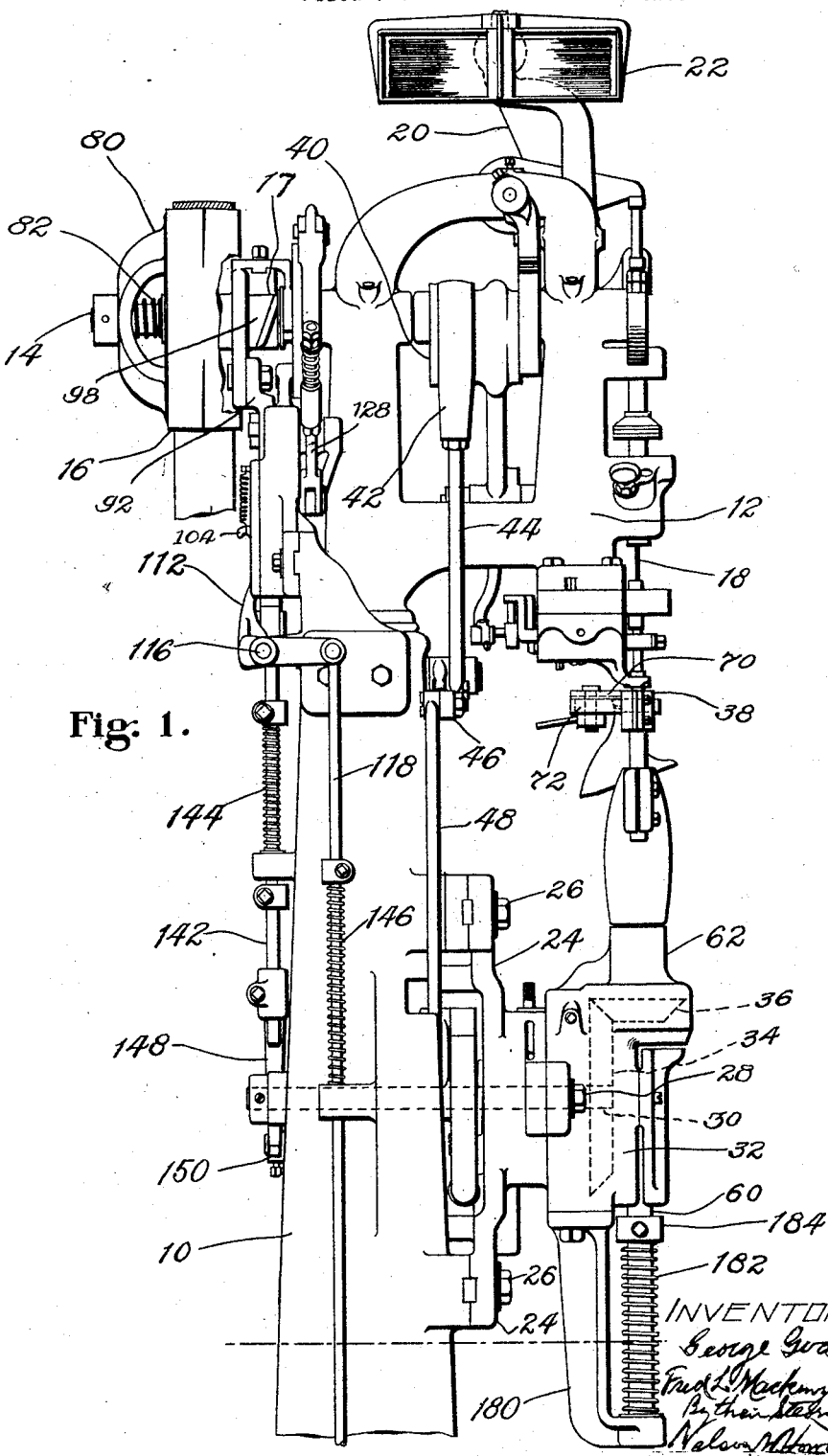
Fig. 1 is a side elevation of the head and work support of a fastening inserting machine embodying the present invention.

The invention is illustrated as embodied in a fastening inserting machine having fastening inserting instrumentalities of the type disclosed in U. S. Patent No. 910,147, granted January 19, 1909, on an application filed by Frederick H. Perry to which reference may be had for a fuller description of the fastening inserting instrumentalities themselves.

The illustrated machine is provided with a column 10 supporting a head 12 in which is journaled a shaft 14 rotated by a belt pulley 16 through clutch mechanism 17 which will be more fully hereinafter described. Shaft 14 transmits power for the operation of a fastening inserting driver 18 through mechanism which may be and is disclosed as of the type illustrated in the Perry Patent No. 910,147, above referred to. In the illustrated machine, as in the machine of that patent, fastenings are severed from a wire 20 supplied from a reel 22 carried by the head of the machine.

Figure 5:
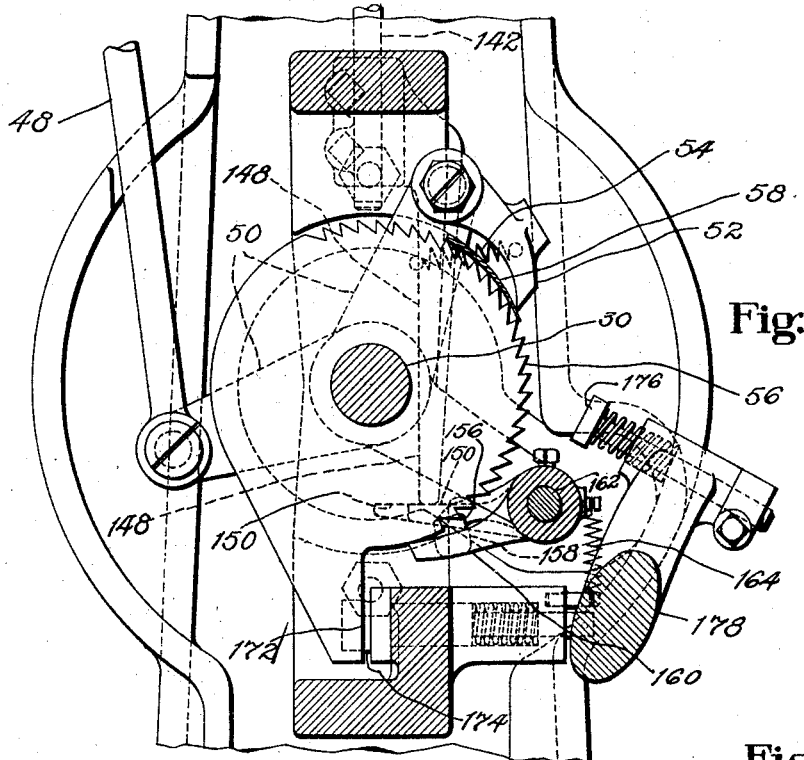
Fig. 5 is a section on the line 5—5 of Fig. 4.
Figure 4:
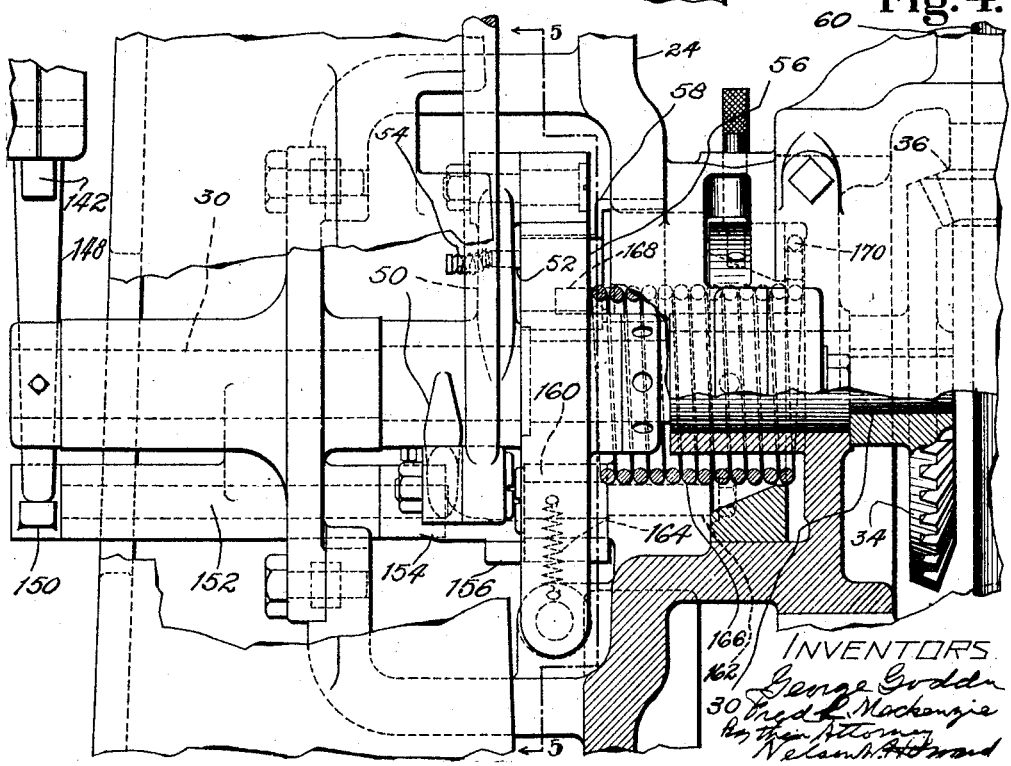
Fig. 4 is a side elevation, partly in section, of a portion of the work support controlling mechanism of the machine.

Horizontally adjustable upon the column 10 of the machine is a slide 24 connected to the column through bolt and slot connections 26 (Figs. 1 and 3). Connected to slide 24 through screw and slot connections 28 and concentric with a shaft 30 (Figs. 4 and 5) suitably journaled in the slide 24 is a pivotally adjustable work support provided with a gear casing 32 arranged to house bevel gears 34, 36 (Figs. 1 and 4) which serve, as more fully hereinafter set forth to transmit power from the shaft 30 to the work receiving clamp 38 of the work support.

Shaft 30 is given a step-by-step rotation from the continuously rotating shaft 14 by suitable mechanism which, as illustrated, comprises an eccentric 40 carried by shaft 14 and connected through an eccentric strap 42 and a link 44 with a lever 46 fulcrumed to the column of the machine and itself connected by a link 48 with a bell crank lever 50 rotatably mounted upon shaft 30. Mounted upon the right hand arm of lever 50 (Fig. 5) is a pawl 52 urged by a spring 54 towards lever 50 and arranged as the bell crank lever is rotated to engage and rotate a ratchet 56 secured to shaft 30. An adjustable guard or shield 58 is utilized to vary the effective length of the stroke of pawl 52.

Bevel gear 36 is secured to an approximately vertical shaft 60 (Figs. 1 and 3) having a bearing in an upwardly extending portion 62 of the gear casing 32 and carrying at its upper end a work engaging member 64 illustrated as of a character to engage the attaching surface of a wooden heel. Clamped to shaft 60 is an upwardly and outwardly extending bracket 66 in which is mounted for sliding adjustment a rod 68 carrying at its upper end a clamp member 70 arranged to co-operate with member 64 rigidly to hold the work. As illustrated, clamp member 70 is provided with a block 72 having a V-shaped opening at its forward end and adjustable as by a bolt and slot connection, and arranged to form a gage member for engaging the contour surface of the tread portion of the heel and toplift to be operated upon. The heel clamp just described is mounted and may be adjusted so that the axis of rotation of shaft 60 and the coinciding axis of the top lift of the heel are out of alinement with the line of drive of the fastenings to such an extent that as the work and the work support are rotated about the axis of shaft 60, the work will be presented to the fastening inserting instrumentalities in such a manner as to cause the insertion of a row of fastenings arranged upon an arc of a circle, and thus at approximately equal distances from the periphery of the toplift of a Louis heel. Since the housing 32 is pivotally adjustable, the work support may be rocked sidewise about shaft 30 and then, after bolts or connections 28 have been tightened, the slide 24 may be moved laterally of the machine to bring the work back into the desired relation to the line of drive and the bolts or connections 26 tightened so that the work support is secured in adjusted position. With the work support thus adjusted the fastenings will be caused to toe in towards the center of the work, and any possibility of any of the fastenings being driven outwardly through the concave contour surface of a Louis heel will be eliminated.

The illustrated machine is provided with suitable clutch and brake mechanism for controlling the operation of shaft 14 and with mechanism for returning the work support to its initial position when the treadle is released at the conclusion of the insertion of a row of fastenings.

Suitably secured to shaft 14 and arranged to co-operate with a clutch surface formed upon pulley 16 is a clutch member 80, the pulley being normally held out of contact with the clutch member by a light spring 82 (Fig. 1). Surrounding shaft 14 is a heavy compression spring 84, one end of which bears against a washer 86 contacting with a collar 88 formed upon the hub of a combined cam and brake member 90 fast upon shaft 14 (Figs. 6 and 7). Mounted in suitable ways formed upon or carried by the head of the machine, is a slide 92, the upper end of which has an inclined or wedge formation 94 arranged to engage with a co-operating or complemental inclined or wedge portion 96 formed upon a sleeve 98 surrounding shaft 14 and counterbored to form a housing for spring 84. Rotation of sleeve 98 is prevented by the engagement of the edges of wedge portion 96 with a pair of wings 100 formd upon slide 92. Pivoted at 102 to the lower end of slide 92 is a bell crank lever 104 provided with a spring 106 suitably anchored to the slide and tending to move the bell crank lever in a clockwise direction, as viewed in Fig. 6. Rigid with bell crank lever 104 is a finger 108 arranged for movement into and out of engagement with a lug 109 carried by a slide 110 mounted for vertical reciprocation in the head of the machine, and carrying at its upper end a cam roll 111 located in a cam track formed in member 90. Thus when finger 108 lies in the path of engagement of lug 109, as slide 110 moves down under the control of cam member 90, slide 92 will be forced downwardly thus releasing the thrust of spring 84 transmitted to the hub of pulley 16 through the closed end of sleeve 98 and permitting spring 82 to push pulley 16 out of engagement with clutch member 80.

In order to insure the stopping of the machine at the right instant, a brake 122 (Figs. 3 and 6) is arranged to engage a brake surface 124 formed upon member 90. As illustrated, brake 122 is made of two pivotally-connected parts, one of which is pivoted at 126 to the head of the machine, and the other of which forms a bearing for a rod 128 connected at 130 to one extremity of a U-shaped lever 132, the other extremity of which is forked to engage a roll 134 mounted on a pin carried by a slide 92. Rod 128 is provided at its extremity remote from lever 132 with an abutment, illustrated as a washer and a pair of lock nuts 136. A spring 138 surrounds the rod, bearing upon a suitable seat formed upon brake 122. Thus it will be seen that when slide 92 is depressed to cause the stopping of the machine, lever 132 will be rocked in a counter-clockwise direction, as viewed in Fig. 6, spring 138 being compressed and brake 122 urged into engagement with member 90. Upon the other hand, when the treadle is released and slide 92 is raised the brake will correspondingly be thrown into inoperative condition. The depending arm of bell crank lever 104 is arranged for engagement with a finger 112 carried by lever 114 fulcrumed at 116 to the frame of the machine and connected by a link 118 with a controller or treadle 120. It will thus be apparent that when treadle 120 is depressed to start the machine, finger 108 will be rocked out of engagement with lug 109 and slide 92 will be free to move upwardly, thus permitting spring 84 to force the clutch surface of pulley 16 into engagement with clutch member 80. On the other hand, when the treadle is released to stop the machine, finger 112 will move in a counter-clockwise direction, as viewed in Fig. 6, thus permitting the clockwise rotation of finger 108 under the control of spring 106 (Fig. 6) and connecting slides 92 and 110 so that downward movement of the slide 110 under the control of cam 90 forces the slide 92 downwardly and applies the brake.

Clamped at 140 to slide 92 is a rod 142. A spring 144 surrounding the rod and bearing against a collar clamped to the rod and a lug formed upon the column of the machine tends to raise rod 142 and slide 92. Similarly, a spring 146 surrounding rod 118 and bearing at one end against a lug formed upon the column of the machine and the other end against a collar clamped upon rod 118 tends to raise rod 118 as well as treadle 120, and thus when the treadle is released rocks finger 112 rearwardly.

To the lower end of rod 142 is clamped a finger 148 (Figs. 1, 4 and 5), the lower end of which rests against a lug 150 formed upon a member clamped to a rock shaft 152 suitably journaled in the slide 24, and having secured to its other extremity a collar 154 provided with a lug 156 arranged in the path of movement of a lug 158 carried by a finger 160 secured to a stub shaft 162 journaled in slide 24. A spring 164 tends to rock finger 160 on shaft 162 in a clockwise direction as viewed in Fig. 5, the end of finger 160 being formed as a dog to engage the teeth of ratchet 56 to hold it against retrograde movement during the return movement of pawl 52. A spring 166 anchored at 168 to the ratchet member 56 and at 170 to slide member 24, tends to rotate ratchet 56 and thus gear 34 and the work support to its initial position. This takes place when the treadle 120 is released to cause the machine to stop, since at that time rod 142 is depressed whereby finger 150 and lug 158 are also depressed thus releasing the ratchet from finger 160. A stop 172 formed upon ratchet 56 at this time co-operates with a buffer 174 to limit the reverse movement of the ratchet. As illustrated, a spring pressed plunger 176 (Fig. 5) mounted in a lug 178 carried by the slide 24 prevents pawl 52 from being knocked out of engagement with ratchet 56 at the downward extremity of its path of movement.

In order to lower the work support for the convenient presentation and withdrawal of work from the work support, gear casing 34 carries a downwardly extending bracket 180 having at its lower extremity a bearing for the rod 60. A spring 182 surrounding rod 60 bears at one end against the lower extremity of the bracket 180 and at the other end against a collar 184 clamped to rod 60. Connected to a collar 186 (Fig. 2) also clamped to rod 60 is a link 188 connected to a treadle 190 by means of which the work support may be lowered against the compression of spring 182 for the convenient presentation of the work and its removal from the work holding members 64, 70.

While it is believed that the mode of operation of the machine will be apparent from the foregoing description, it may be briefly summarized as follows: Starting with the machine at rest, the operator depresses treadle 190 thus lowering the work support. A heel, the toplift of which is to be attached, is clamped between the supporting surface of member 64 and clamp member 70, the transverse and rearward positions of the heel being suitably located by means of gage member 72. Treadle 190 is then released and spring 182 raises the work support to operative position. Treadle 120 is then depressed which causes the operation of the fastening inserting means and the rotation of the work support through gearing 34, 36, ratchet 56 and the mechanism for causing oscillating movement thereof. When a sufficient number of fastenings have been inserted, the operator releases treadle 120 whereupon the insertion of fastenings ceases and finger 160 is withdrawn from ratchet 56 so that spring 166 causes reverse movement of the ratchet till stop 172 brings up against buffer 174. This causes reverse movement of gears 34 and 36 and the return of the work support to its initial position.

Having thus described our invention, what we claim as new and desire to secure by Letters Patent of the United States is:—

1. A fastening inserting machine having, in combination, fastening inserting means, a slide adjustable transversely thereof, means for securing the slide in adjusted position, a work support pivotally mounted upon said slide so that the position of the work support relatively to the point of fastening insertion may be adjusted, and means for securing the work support in adjusted position relatively to the slide.

2. A fastening inserting machine having, in combination, fastening inserting means, a slide adjustable transversely thereof, a work support pivoted to the slide, and a clamp for securing the work support in adjusted position relatively to the slide.

3. A fastening inserting machine having, in combination, fastening inserting means, a slide adjustable transversely thereof, a work support pivoted to said slide and adjustable relatively thereto, said transverse and pivotal adjustments serving to control the angular relation of the work to the fastening inserting means to control the point of fastening insertion, and means for securing said slide in adjusted position.

4. A fastening inserting machine having, in combination, fastening inserting means, a slide adjustable transversely thereof, a work support pivotally carried by the slide and adjustable to control the angular relation of the work to the fastening inserting means, and a clamp for securing the work support against pivotal movement relatively to the slide.

5. A machine for slugging shoe heels having, in combination, slug inserting means, a support for an unattached heel constructed and arranged to cause the heel to be presented to the slug inserting means with its tread face at an angle to the direction of slug insertion to cause the slugs to be inserted in a direction inclined inwardly toward the center of the heel, and means for rotating the heel support as the fastenings are inserted.

6. A machine for slugging shoe heels having, in combination, slug inserting means, a work support rotatable about an axis inclined with respect to the line of drive of the slugs, and a clamp for holding an unattached heel on the support.

7. A fastening inserting machine having, in combination, fastening inserting means, a work support mounted for rotation about a stationary but adjustable axis inclined with respect to the line of drive of the fastenings to present the work at a predetermined angle to the line of drive of the fastenings as they are inserted by the fastening inserting means, and means for rotating the work support about said axis.

8. A fastening inserting machine having, in combination, fastening inserting means, a work support, and means for rotating the work support step-by-step about an axis inclined at a predetermined angle with respect to the line of drive of the fastenings to move the work relatively to the fastening inserting means between the insertion of successive fastenings.

9. A machine of the class described having, in combination, a reciprocating tool, a work support, a clamp formed and arranged to secure a heel to the work support, and means for rotating the work support about an axis having a constant small inclination with respect to the path of the tool to present to the tool a heel clamped to the work support.

10. A machine of the class described having, in combination, a reciprocating tool, a work support, and means for rotating the work support step-by-step about an axis having a constant inclination of only a few degrees with respect to the path of the tool to move the work relatively to the tool between successive reciprocations of the tool thereby causing the fastenings inserted to toe-in away from the edge of the work.

11. A machine of the class described having, in combination, fastening inserting means, a work support, and gearing for rotating the work support step-by-step about an axis out of alinement with the line of drive of the fastenings, arranged for adjustment to vary the angular relation of the axis of rotation and the line of drive of the fastenings and to maintain said angle of adjustment fixed throughout the operation on each piece of work.

12. A machine of the class described having, in combination, a reciprocating tool, a work support, gearing for rotating the work support about an axis out of alinement with the path of the tool, and means carrying the work support arranged for adjustment to vary the angular relation of the axis of rotation and the path of the tool and including means for securing the work support in adjusted position.

13. A fastening inserting machine having in combination, fastening inserting means, a clamp arranged to hold the work, and means for rotating the clamp about an axis slightly inclined with respect to the line of drive of the fastening inserting means to present the clamped work to the fastening inserting means.

14. A fastening inserting machine having, in combination, fastening inserting means, a clamp arranged to hold the work, and means for rotating the clamp step-by-step about an axis inclined a few degrees with respect to the line of drive of the fastening inserting means to move the clamped work relatively to the fastening inserting means between the insertion of successive fastenings.

15. A machine of the class described having, in combination, a tool operating in a predetermined path, a support provided with a clamp to hold the work during the operation of the tool thereon, means permitting the adjustment of the clamp both pivotally and bodily transversely to the path of the tool, and means for securing the clamp in adjusted position.

16. A fastening inserting machine having, in combination, fastening inserting means and a support provided with a clamp to hold the work during the insertion of fastenings therein, means permitting adjustment of the clamp both pivotally and bodily transversely of the fastening inserting means, and means for securing the clamp in adjusted position.

17. A machine of the class described having, in combination, a tool operating in a predetermined path, a work support to present the work thereto arranged for pivotal and bodily adjustment transversely of the tool, and means for feeding the work past the tool.

18. A fastening inserting machine having, in combination, fastening inserting means, a work support to present the work to the fastening inserting means arranged for pivotal and bodily adjustment transversely of the fastening inserting means, and means for feeding the work past the fastening inserting means.

19. A machine of the class described having, in combination, a tool operating in a predetermined path, a work support to present the work to the tool arranged for pivotal and for transverse bodily adjustment, means for securing the work support in adjusted position, and means for feeding work on the work support past the tool.

20. A fastening inserting machine having, in combination, fastening inserting means, a work support to present the work to the fastening inserting means arranged for pivotal and bodily adjustment transversely of the fastening inserting means, means for securing the work support in adjusted position, and means for feeding the work past the fastening inserting means.

21. A fastening inserting machine having, in combination, fastening inserting means, and a work support to present work to the fastening inserting means arranged for pivotal adjustment to cause the fastenings to toe in from the edge of the work and for bodily adjustment to bring the work into the desired transverse relationship to the fastening inserting means, and means for clamping the work support in adjusted position.

22. A machine of the class described having, in combination, a tool operating in a predetermined path, and a work support to present work to the tool and arranged for pivotal adjustment to vary the inclination of the work to the path of the tool and for bodily adjustment to bring the work into the desired transverse relationship to the path of the tool.

23. A fastening inserting machine having, in combination, fastening inserting means and a work support to present work to the fastening inserting means arranged for rocking adjustment about an axis parallel to the surface in which fastenings are inserted and bodily adjustable in a direction parallel to said surface, and means for securing the work support in adjusted position.

24. A fastening inserting machine having, in combination, fastening inserting means, a slide adjustable transversely thereof, a work support pivotally carried thereby, a clamp for securing the work support in adjusted position relatively to the slide, and gearing for rotating the work support about an axis out of alinement with the line of drive of the fastening inserting means to feed the work to and past the fastening inserting means.

25. A fastening inserting machine having, in combination, fastening inserting means, a slide adjustable transversely thereof, a work support pivotally carried thereby, a clamp for securing the work support in adjusted position, and gearing for rotating the work support about an axis inclined with respect to the line of drive of the fastening inserting means to feed the work to and past the fastening inserting means.

26. A machine of the class described having, in combination, a tool operating in a predetermined path, a work support to present the work thereto arranged for pivotal and bodily adjustment transversely of the path of the tool, means for securing the work support in adjusted position, and means for rotating the work support about an axis out of alinement with the path of the tool to cause the tool to operate on the work at spaced points arranged upon an arc of a circle.

27. A fastening inserting machine having, in combination, fastening inserting means, a work support to present the work to the fastening inserting means and arranged for pivotal and bodily adjustment transversely of the fastening inserting means, means for securing the work support in adjusted position, and means for rotating the work support about an axis out of alinement with the line of drive of the fastenings to cause the fastenings to be inserted in the work at spaced points therein.

28. A fastening inserting machine having, in combination, fastening inserting means, a slide adjustable transversely thereof, a work support pivotally carried thereby, a clamp for securing the work support in adjusted position, gearing for rotating the work support about an axis out of alinement with the line of drive of the fastening inserting means to feed the work to and past the fastening inserting means, and means for reversely returning the work support to initial position whenever the machine is stopped.

29. A fastening inserting machine having, in combination, fastening inserting means, a slide adjustable transversely thereof, a work support pivotally carried thereby, a clamp for securing the work support in adjusted position, gearing for rotating the work support about an axis inclined with respect to the line of drive of the fastening inserting means to feed the work to and past the fastening inserting means, and a spring for returning the work support to initial position at the conclusion of the insertion of a series of fastenings.

30. A fastening inserting machine having, in combination, fastening inserting means, a work support to present work thereto, means for moving the work support to cause the work to move forward a step after the insertion of each fastening, a manually operable controller movable to start and stop the machine, and means operative upon movement of the controller to stop the machine to cause the work support to reverse its movement and return to its initial position.

31. A fastening inserting machine having, in combination, fastening inserting means, a work support to present work thereto, means for adjusting the work support to cause the fastenings to toe in away from the edge of the work, means for moving the work support to cause the work to move forward a step after the insertion of each fastening, a controller movable between operative and inoperative positions to initiate and conclude operation of the machine, and means operative upon movement of the controller into inoperative position to cause the work support to return to its initial position.

32. A fastening inserting machine having, in combination, fastening inserting means, a work support to present work to the fastening inserting means, step-by-step operating means to move the work support and the work carried thereby about a fixed axis to present the work to the fastening inserting means for the insertion of a series of fastenings in the work, and means for rotating the work support in the opposite direction and thereby returning the work support to its initial position whenever the machine is stopped.

33. A fastening inserting machine having, in combination, fastening inserting means, a work support, means to rotate the work support step-by-step about a fixed axis to present the work to the fastening inserting means for the insertion of fastenings in a row in the work, and a spring tensioned during the work feeding movement of the work support, and operative to rotate the work support and thereby to return the work support to its initial position at the conclusion of the insertion of a row of fastenings.

In testimony whereof we have signed our names to this specification.

GEORGE GODDU.
FRED L. MACKENZIE.